(12) United States Patent
Karlsson et al.

(10) Patent No.: US 10,498,151 B2
(45) Date of Patent: Dec. 3, 2019

(54) POWER TOOL WITH STEP-UP CONVERTER

(71) Applicant: ATLAS COPCO INDUSTRIAL TECHNIQUE AB, Stockholm (SE)

(72) Inventors: Karl Peter Karlsson, Årsta (SE); Lars Peter Johan Kjellqvist, Mölnbo (SE); Sven Martin Sigrand, Trångsund (SE)

(73) Assignee: ATLAS COPCO INDUSTRIAL TECHNIQUE AB, Tokyo (JP)

( * ) Notice: Subject to any disclaimer, the term of this patent is extended or adjusted under 35 U.S.C. 154(b) by 844 days.

(21) Appl. No.: 14/783,371

(22) PCT Filed: Apr. 30, 2014

(86) PCT No.: PCT/EP2014/058835
§ 371 (c)(1),
(2) Date: Oct. 8, 2015

(87) PCT Pub. No.: WO2014/177618
PCT Pub. Date: Nov. 6, 2014

(65) Prior Publication Data
US 2016/0049817 A1     Feb. 18, 2016

(30) Foreign Application Priority Data
May 3, 2013    (SE) .................................. 1350546

(51) Int. Cl.
*H02J 7/00*     (2006.01)
*B25F 5/00*     (2006.01)
*H02M 3/07*     (2006.01)

(52) U.S. Cl.
CPC .............. *H02J 7/0052* (2013.01); *B25F 5/00* (2013.01); *H02J 7/0065* (2013.01); *H02M 3/07* (2013.01)

(58) Field of Classification Search
CPC .......... H02J 7/0052; H02J 7/0065; B25F 5/00
See application file for complete search history.

(56) References Cited

U.S. PATENT DOCUMENTS

2002/0175646 A1    11/2002  Kushida et al.
2006/0119322 A1*    6/2006  Maleki ................ H01M 10/486
                                                                 320/150

(Continued)

FOREIGN PATENT DOCUMENTS

EP          1260170 A1    11/2002

OTHER PUBLICATIONS

International Search Report (ISR) dated Dec. 22, 2014 and International Preliminary Report on Patentability (IPRP) dated Jun. 2, 2015 issued in International Application No. PCT/EP2014/058835.

*Primary Examiner* — Chelsea E Stinson
(74) *Attorney, Agent, or Firm* — Holtz, Holtz & Volek PC

(57) ABSTRACT

A power tool, includes an electrical motor unit connectable to a battery unit, wherein: a step-up converter, connectable between the battery unit and electrical motor unit, converts a battery voltage $U_{battery}$ provided by the battery unit to a higher step-up voltage $U_{step-up}$, and provides $U_{step-up}$ to the electrical motor unit as an output voltage $U_{output}$; a bypass circuit, arranged in parallel with the step-up converter, connects the battery unit to and provides $U_{battery}$ to the electrical motor unit as $U_{output}$; and at least one control unit is arranged to control the step-up converter and the bypass circuit, such that $U_{output}$ can switch between $U_{battery}$ and $U_{step-up}$, based on tool related parameters, including $U_{output}$, an output current $I_{output}$ provided to the motor, a rotational speed $\omega_{motor}$ of the motor unit multiplied with a torque T provided by the tool, and an output power $P_{output}$ provided to the electrical motor unit.

32 Claims, 4 Drawing Sheets

(56) References Cited

U.S. PATENT DOCUMENTS

2010/0156175 A1  6/2010 Wei
2012/0191250 A1* 7/2012 Iwata ..................... B25F 5/00
                                                700/275

* cited by examiner

POWER TOOL WITH STEP-UP CONVERTER

FIELD OF THE INVENTION

The present invention relates to a power tool including an electrical motor unit that is connectable to a battery unit.

The present invention also relates to a method for providing an electrical motor unit of a power tool with an output voltage $U_{output}$.

The present invention also relates to a computer program and to a computer program product.

RELATED ART AND BACKGROUND OF THE INVENTION

Power tools including an electrical motor unit are often provided with electrical power from a battery unit. FIG. 1 schematically shows an example of such a power tool 100. The power tool 100 includes a body/housing 101 and a shaft/spindle 102. An electrical motor unit is used for driving the shaft 102. The electrical motor is driven by a battery unit 104. The battery unit 104 can be mounted at a handle 103 of the power tool, as shown in FIG. 1, but can also be mounted on other parts of the power tool 100. However, the battery unit 104 can also be located separated from the power tool 100, and the electrical power can then be provided to the electrical motor unit by one or more cables that are connected between the external battery unit and the power tool 100. The power tool 100 further includes a number of parts not shown in FIG. 1, as is understood by a skilled person.

Power tools of today, such as nut-runners, generally have problems relating to the size and weight of the power tool. There is generally a demand for reducing the size and/or the weight of the power tools, since a small and lightweight power tool is very useful for the consumer, because it is easy to transport and also practical to use, since it is not too heavy to hold and handle.

Power tools include a number of parts adding to the size and/or weight of the tool. One part having a big influence on the both the size and the weight of the tool is the battery unit. The performance of the power tool is today directly related to the power being supplied by the battery unit, and is thereby also directly related to the size and weight of the battery unit. For example, both the run-down speed and the torque provided by a nut-runner are directly related to a voltage level of the battery unit. Therefore an efficient and high performing nut-runner today has to be provided with a large and heavy battery pack.

In order to try to adapt the power tool to a current performance demand, while minimizing the size and/or weight of the tool, some prior art solutions have utilized a set of different battery units or batteries having different powers and/or voltages. Thus, depending on the needed performance of the power tool, the user has the possibility to choose a suitable battery unit or battery from this set to be connected to the power tool. Hereby, the size and weight of the power tool can be adapted to the performance demand. Handling of a very powerful power tool, which also is very heavy and large, when a much less powerful, and also much smaller and lighter, tool would have been sufficient can hereby be avoided.

However, the set of battery units that can be used in the power tool must still be carried along with the power tool by a user to achieve adaptability of performance and size of the tool. Also, all battery units have to be charged for the user to be able to adapt the battery supply during work with the tool, which makes this solution not very practical. Also, battery units and/or batteries having different powers and/or voltages are today often provided with different connection interfaces. Thus, a first battery having a first voltage/power may be directly connectable to the power tool while a second battery having a second voltage/power is often not directly connectable to the power tool. It might therefore be difficult to efficiently interchange the batteries, at least without the use of one or more battery adapters.

AIM AND MOST IMPORTANT FEATURES OF THE INVENTION

It is an object of the present invention to provide a power tool that at least partly solves one or more of the above stated problems.

The present invention aims to provide a more compact and lightweight power tool than the power tools known in the background art.

The power tool and method according to the present invention are characterized in that an output voltage $U_{output}$ that is provided to an electrical motor unit in the tool may be switched between a battery voltage $U_{battery}$ and a higher step-up voltage $U_{step-up}$. This switchable output voltage $U_{output}$ is according to the claimed invention achieved by a step-up converter, a bypass circuit, and at least one control unit controlling the step-up converter and the bypass circuit.

The step-up converter is connectable between a battery unit and the electrical motor unit and is arranged for converting, when enabled, a battery voltage $U_{battery}$ being provided to the step-up converter by the battery unit to a higher step-up voltage $U_{step-up}$; $U_{step-up} > U_{battery}$. This step-up voltage $U_{step-up}$ is then provided to the electrical motor unit as an output voltage $U_{output}$; $U_{output} = U_{step-up}$.

The bypass circuit is arranged in parallel with the step-up converter, thereby connecting, when enabled, the battery unit directly to the electrical motor unit and providing the battery voltage $U_{battery}$ to the electrical motor unit as an output voltage $U_{output}$; $U_{output} = U_{battery}$.

At least one control unit is arranged for controlling the step-up converter and the bypass circuit in order to switch the output voltage $U_{output}$ between the battery voltage $U_{battery}$ and the step-up voltage $U_{step-up}$. This controlled switching can be achieved by generating a bypass enabling/disabling signal $S_{bypass\_on/off}$ and a step-up enabling/disabling signal $S_{step-up\_on/off}$, and by proving these enabling/disabling signals to the bypass circuit and the step-up converter, respectively.

The power tool according to the present invention can utilize enabling/disabling of the bypass circuit and the step-up converter, respectively, to alter the output voltage $U_{output}$ that is provided to the motor unit such that a temporally increased rotational speed of the electrical motor unit is achieved. Hereby the productivity of the power tool is increased.

Alternatively, a smaller and lighter battery unit, and thereby a more compact and less heavy power tool, as compared to prior art power tools, can be provided by the present invention. A compact and lightweight power tool is easily handled and therefore the usage of the power tool is improved by the present invention.

According to an embodiment of the present invention, the power tool can be particularly adapted to perform certain activations of the tool, such as tightening and/or loosening of nuts, during which the speed and/or torque should change during the activation to achieve optimal performance. For example, when tightening of a nut, the step-up converter can be enabled and the bypass circuit can be disabled during a first phase of the tool activation. During a second phase, the bypass circuit can be enabled and the step-up converter can be disabled. Hereby, a high rotational speed and low torque is provided by the power tool during the first phase, followed by a lower rotational speed and higher torque during the second phase. This gives an optimal performance for e.g. a nut-runner when tightening a nut, where a high speed but not too much moment of force is needed during the first phase, and much more moment of force is needed during the second phase. According to the invention, this optimal performance is achievable with a compact and lightweight power tool.

When loosening a nut, the first phase can instead provide a high torque T and low rotational speed, and the second phase can provide a high rotational speed and a low torque. This is achieved by enabling the bypass circuit and disabling the step-up converter during the first phase of the activation, followed by enabling the step-up converter and disabling the bypass circuit during the second phase. This gives an optimal performance to e.g. a compact and lightweight nut-runner when loosening a nut, where much rotational force is needed during the first phase, and much less rotational force is needed during the second phase.

Detailed exemplary embodiments and advantages of the power tool and the method according to the invention will now be described with reference to the appended drawings illustrating some preferred embodiments.

DETAILED DESCRIPTION OF PREFERRED EMBODIMENTS

Figure 1:
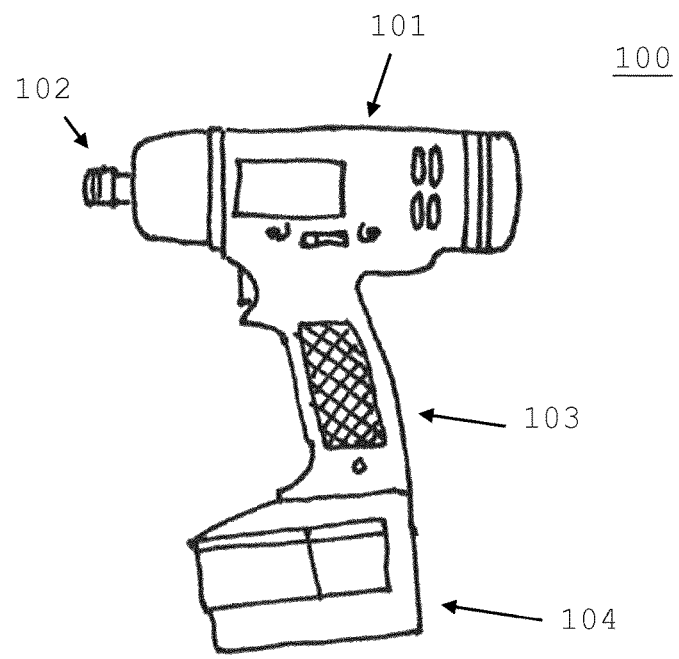
FIG. 1 shows a power tool.
Figure 2:
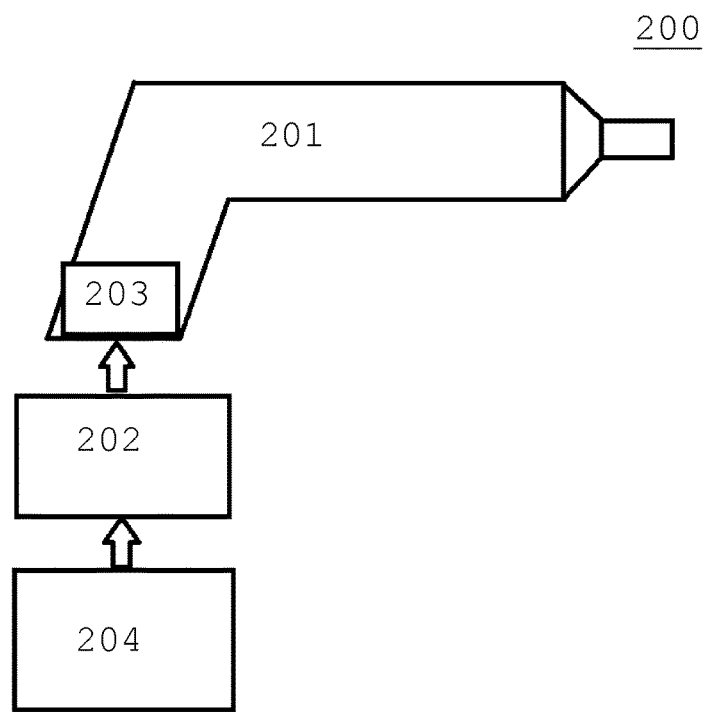
FIG. 2 shows a power tool according to the present invention.

According to the present invention, the power tool includes a step-up converter, a bypass circuit, and at least one control unit as will be explained in detail below. FIG. 2 schematically shows such a power tool 200. In FIG. 2, the step-up converter, the bypass circuit, and the one or more control units are illustrated as a step-up/bypass module 202 being connectable between a battery unit 204 and an electrical motor unit 203 located within the body 201 of the tool 200.

According to one embodiment of the invention, the step-up module 202, i.e. the step-up converter, the bypass circuit, and the one or more control units, is arranged integrated within the body 201 of the power tool 200, and is connected to the electrical motor unit 203 and to the battery unit 204.

According to another embodiment of the invention, the step-up/bypass module 202 is integrated with the battery unit 204. Here the integrated battery and step-up/bypass module 202, 204 is connectable to the motor unit 203 of the tool 200.

According to another embodiment of the invention, the step-up/bypass module 202 is arranged separately, i.e. as a separate unit, between the battery unit 204 and the motor unit 203. The separately arranged step-up/bypass module 202 is here thus connectable to both the battery unit 204 and to the motor unit 203.

Figure 3:
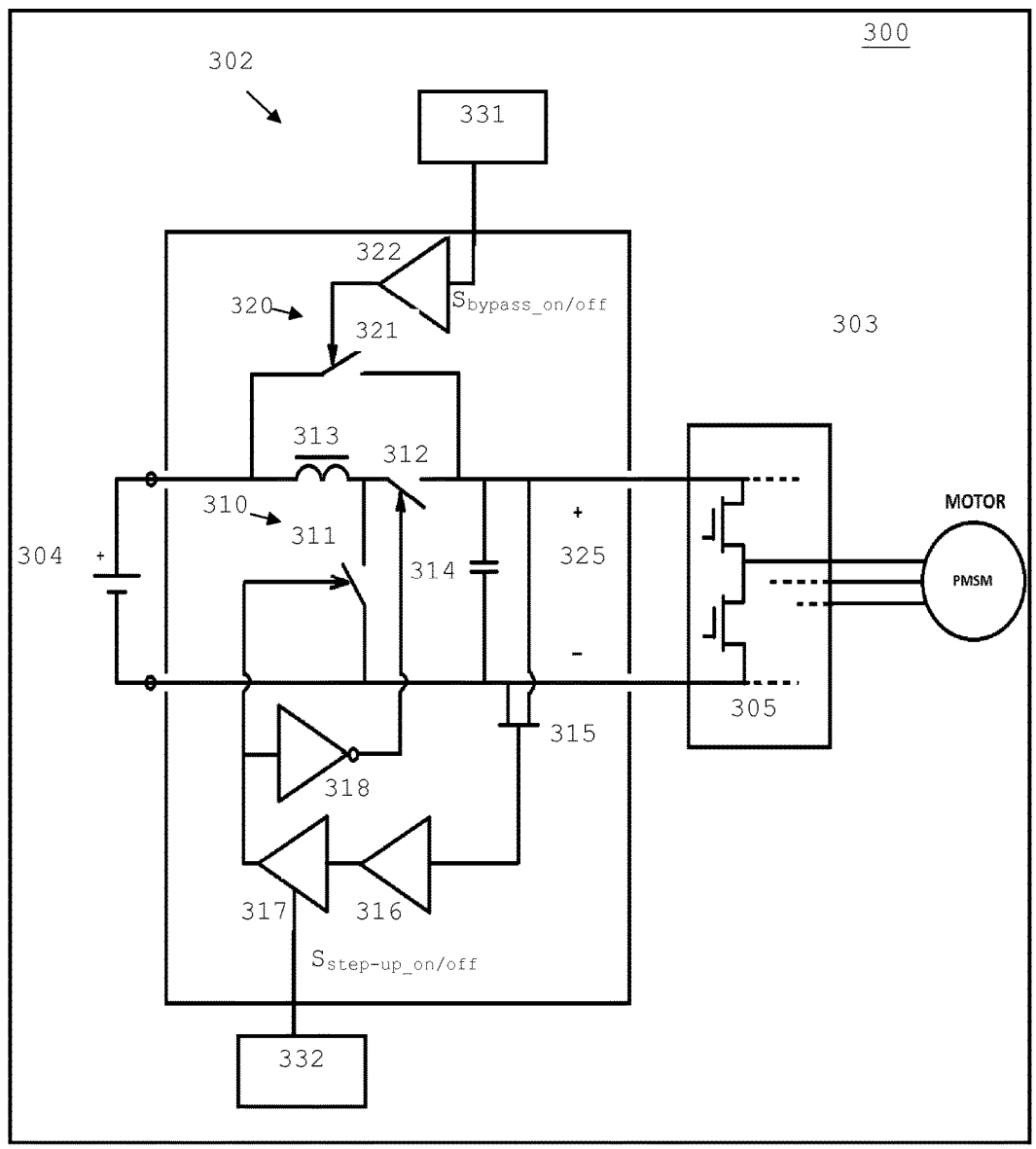
FIG. 3 shows a power tool according to the present invention.

FIG. 3 schematically shows a power tool 300 according to the present invention. In FIG. 3, the power tool 300 is schematically illustrated as including the battery unit 304 and the step-up/bypass module 302. However, as stated above, the battery unit 304 and/or the step-up/bypass unit 302 and/or the one or more control units 331, 332 can also be arranged separately from the power tool 300, i.e. external from the body of the power tool.

The power tool 300 includes an electrical motor unit 303, which is connectable to the battery unit 304 via the step-up/bypass module 302. In FIG. 3, an inverter 305 is included in the electrical motor unit 303. However, depending on the construction of the electrical motor unit 303 and/or of the step-up/bypass module 302, the inverter 305 may be omitted in the power tool 300.

The step-up/bypass module 302 includes a step-up converter 310 and a bypass circuit 320. The step-up converter 310 is connectable between the battery unit 304 and the electrical motor unit 303. The step-up converter 310 can be enabled and disabled, and is arranged for converting, when enabled, a battery voltage $U_{battery}$ being provided to the step-up converter 310 by the battery unit 304. The step-up converter 310 thereby converts the battery voltage $U_{battery}$ to a higher step-up voltage $U_{step-up}$; $U_{step-up}>U_{battery}$. This higher step-up voltage $U_{step-up}$ is then provided to the electrical motor unit 303 as an output voltage $U_{output}$ on the output DC bus 325, i.e. $U_{output}=U_{step-up}$. Thus, the electrical motor unit 303 is provided with the higher step-up voltage $U_{step-up}$ when the step-up converter 310 is enabled.

The bypass circuit 320 is arranged in parallel with the step-up converter 310, and is thus also connectable between the battery unit 304 and the electrical motor unit 303. When the bypass circuit 320 is enabled, the battery unit 304 is connected to the electrical motor unit 303 through the bypass circuit 320. The bypass circuit is thus arranged for providing the battery voltage $U_{battery}$ to the electrical motor unit 303, as an output voltage $U_{output}$ on the output DC bus 325, i.e. $U_{output}=U_{battery}$.

The power tool can also be equipped with a brake chopper arranged for protecting the battery unit 304 by preventing the output voltage $U_{output}$ on the output DC bus 325 to reach too high levels when the electrical motor unit 303 is braked/decelerated. Generally, energy is created by the electrical motor unit 303 when a user lets go of the tool trigger, whereby the rotational speed of the power tool is reduced, especially if the higher step-up voltage $U_{step-up}$ has been provided to the electrical motor unit before braking the electrical motor unit is initiated. The brake chopper can be arranged at the output DC bus 325, between the step-up/bypass module 302 and the electrical motor unit 303. For example, the brake chopper can be implemented as a resistance coupled in series with a switch, such as a MOSFET (Metal Oxide Semiconductor Field Effect Transistor), over the output DC bus 325, and with a diode coupled in parallel with the resistance. Hereby, the energy that is created by the electrical motor unit 303 during its deceleration can be consumed by the resistance, which reduces the output voltage $U_{output}$ on the output DC bus 325 in order to protect the battery unit 304.

The power tool 300 according to the present invention further includes at least one control unit 331, 332. The at least one control unit 331, 332 is arranged for controlling the step-up converter 310 and the bypass circuit 320 by enabling/disabling the step-up converter 310 and the bypass circuit 320. The output voltage $U_{output}$ on the output DC bus 325 may hereby be switched between the battery voltage $U_{battery}$ and the step-up voltage $U_{step-up}$. Thus, by controlling the enabling/disabling of the step-up converter 310 and the bypass circuit 320, respectively, the output voltage $U_{output}$ on the output DC bus 325 can be toggled between the lower battery voltage $U_{battery}$, and the higher step-up voltage $U_{step-up}$; $U_{battery} \leq U_{output} \leq U_{step-up}$.

The power tool 300 according to the present invention can thus temporally increase the rotational speed of the electrical motor unit 303 by providing the temporally increased step-up voltage $U_{step-up}$ to the electrical motor unit 303. Hereby the productivity of the power tool 300 is increased.

Alternatively, the same rotational motor speed as was used in prior art solutions can be achieved by use of a battery unit having a lower voltage $U_{battery\_invention}$ than was possible for the battery voltage $U_{battery\_prior\_art}$ in the prior art solutions; $U_{battery\_invention} < U_{battery\_prior\_art}$; since the increased step-up voltage $U_{step-up}$ by the invention temporally can be high enough to match the prior art voltage $U_{step-up} = U_{battery\_prior\_art}$. Hereby a smaller and lighter battery unit 304, and thereby a more compact and less heavy power tool 300, is provided by the present invention. A compact and lightweight power tool 300 is easily handled, and therefore easier more attractive usage of the power tool 300 is facilitated by the invention.

Also, the step-up and bypass module 302 can be made compact and lightweight according to the solution of the present invention. This is due to the use of the bypass circuit 320 according to the invention. When the motor 303 provides a high effect during heavy load, the bypass circuit 320 is enabled and the step-up converter 310 is disabled, whereby the battery unit 304 is directly coupled to the motor unit 303, possibly including an inverter 305. Hereby, the components of the step-up converter 310 only have to be able to cope with a limited power, since the step-up converter 310 is bypassed when a maximum power is provided from the battery unit 304 to the motor unit 303. Thus, since these components only have to cope with a relatively low electrical power, the step-up and bypass module 302 can be designed to be compact and lightweight, which also reduces the total size and weight of the power tool 300.

According to an embodiment of the present invention, the step-up converter 310 is a synchronous step-up converter, which is arranged for creating the higher step-up voltage $U_{step-up}$, said step-up converter including at least one step-up transistor 311, at least one inductor 313, and at least one step-up switch 312. The at least one step-up transistor 311 and/or the at least one step-up switch 312 can typically be switched at a relatively high frequency, e.g. at a frequency in the kilohertz (kHz) range. As illustrated in FIG. 3, the inductor 313 is coupled in series with the battery unit 304 and the step-up switch 312. The step-up transistor 311 is coupled in parallel with the battery unit 304 and in parallel with an output capacitor 314 that is coupled over the output DC bus 325.

The step-up converter can further include a step-up control circuitry being arranged for controlling the at least one step-up transistor 311 and/or the at least one step-up switch 312, where the step-up switch 312 can be used for connecting the step-up converter 310 to the output DC bus 325, i.e. to the electrical motor unit 303, when enabled. The step-up control circuitry includes a voltage regulation circuitry 316 and a PWM (Pulse Width Modulation) circuit 317. The voltage regulation circuitry 316, which can be implemented as an amplifier, is arranged for controlling the level of the higher step-up voltage $U_{step-up}$ towards its target voltage $U_{target}$ by controlling the PWM circuit 317. The voltage regulation circuitry 316 has the output DC bus 325 as an input 315.

The PWM circuit 317 also includes an overload limiting function, which limits/reduces the step-up voltage $U_{step-up}$ if the step-up converter 310 is overloaded. The PWM circuit 317 also has an input receiving a control signal $S_{step-up\_on/off}$ being provided from a control unit 332 as an input signal. The function of the at least one step-up transistor 311 and the at least one step-up switch 312 is thus controlled by the step-up control circuitry, and in particular by the PWM circuit 317. The control signal that is used for controlling the step-up transistor 311 is provided directly by the PWM circuit 317. The control signal that is used for controlling the step-up switch 312 is an amplified and inverted version of the control signal provided by the PWM circuit 317, where the amplification and inversion are performed by the amplifier/inverter 318.

According to an embodiment of the present invention, the bypass circuit 320 includes a bypass switch 321, which is controllable by a control unit 331 providing a bypass control signal $S_{bypass\_on/off}$. Thus, the bypass switch 321 is switched at a very low frequency, e.g. twice per activation of the tool, as will be described more in detail below. An amplifier 322 can be used for amplifying the bypass control signal $S_{bypass\_on/off}$ from the control unit 331 before providing the amplified control signal to the bypass switch 321.

In FIG. 3, for illustrative reasons, the control units 331, 332 providing the control signals $S_{bypass\_on/off}$ and $S_{step-up\_on/off}$ are illustrated as two separate control units. However, as is clear for a skilled person, both of these control signals $S_{bypass\_on/off}$ and $S_{step-up\_on/off}$ can also be provided by a single control unit, essentially including the above and/or below described functions of both of these control units 331, 332.

According to an embodiment of the present invention, one or more of the at least one step-up switch 311, the step-up switch 312, and the at least one bypass switch 321 are implemented as an N-channel MOSFET (Metal Oxide Semiconductor Field Effect Transistor), an P-channel MOSFET (Metal Oxide Semiconductor Field Effect Transistor), or another suitable controllable switching device.

According to an embodiment of the present invention, at least one of the step-up switch 312 and the at least one bypass switch 321 are implemented as power diodes, which are especially suitable for lower power applications.

According to an embodiment of the present invention, the step-up converter 310 is a multi-phase converter that is adapted to convert the battery voltage $U_{battery}$ to a higher step-up voltage $U_{step-up}$. The multi-phase converter can be a boost type converter, being controllable by the control signal $S_{step-up\_on/off}$.

According to an embodiment, the step-up converter 310 is implemented as including two step-up transistor circuits that is operated in mutually opposite phases. Hereby, a smooth output step-up voltage $U_{step-up}$ can be provided by the step-up converter 310, since a voltage/current ripple on the output DC bus 325 can be reduced by the opposite phase coupled transistor configuration.

According to an embodiment of the invention, the battery unit 304 includes at least one super capacitor. Super capacitors have a very high capacitance value per unit volume and a very high energy density. The super capacitors can thus be utilized as a reliable energy source, as an alternative to a conventional battery. The super capacitors are also very lightweight, much lighter than a corresponding conventional battery energy source. One problem with super capacitors is that they lose their power after a while. However, it is possible to very quickly recharge them again. By the use of the present invention, the output voltage of the super capacitor can be boosted when needed, e.g. when the super capacitor has lost some of its power. For example, the power tool according to the invention, e.g. including a super capacitor in the battery unit, can be used in an assembly line, where the tool could be used for sequential relatively short time periods and could be recharged between these short time periods. By the use of super capacitors, a very compact and light power tool can be provided by implementation of the present invention.

Thus, the at least one control unit 331, 332 is, according to the invention, arranged for providing the bypass circuit 320 with a bypass enabling/disabling signal $S_{bypass\_on/off}$. The bypass circuit 320 is arranged for enabling/disabling the bypass, i.e. for connecting/disconnecting the battery unit 304 to the electrical motor unit 303 based on the bypass enabling/disabling signal $S_{bypass\_on/off}$.

Correspondingly, the at least one control unit 331, 332 is arranged for providing the step-up converter 310 with a step-up enabling/disabling signal $S_{step-up\_on/off}$. Here, the step-up converter 310 is arranged for enabling/disabling the voltage conversion of the step-up converter 310 based on that step-up enabling/disabling signal $S_{step-up\_on/off}$.

According to an embodiment of the present invention, the bypass enabling/disabling signal $S_{bypass\_on/off}$ and the step-up enabling/disabling signal $S_{step-up\_on/off}$ are complementary signals. Thus, the bypass enabling/disabling signal $S_{bypass\_on/off}$ and the step-up enabling/disabling signal $S_{step-up\_on/off}$ have inverse values. In other words, the bypass enabling/disabling signal $S_{bypass\_on/off}$ is an inverse/negated version of the step-up enabling/disabling signal $S_{step-up\_on/off}$.

Thus, the at least one control unit 331, 332 can preferably be utilized for toggling the output DC bus 325 between the battery voltage $U_{battery}$ and the higher step-up voltage $U_{step-up}$, thereby providing a power tool 300 having the above mentioned advantages of the present invention. A compact and lightweight power tool having high productivity is thus provided by the invention.

As described above, the voltage on the output DC bus 325 can be switched between the battery voltage $U_{battery}$ and the higher step-up voltage $U_{step-up}$ based on an step-up enabling/disabling signal $S_{step-up\_on/off}$ that is provided to the PWM circuit 317 by the at least one control unit 331, 332 and/or based on a bypass enabling/disabling signal $S_{bypass\_on/off}$ that is provided to the bypass switch 321 by the at least one control unit 331, 332.

The step-up enabling/disabling signals $S_{step-up\_on/off}$ and the bypass enabling/disabling signals $S_{bypass\_on/off}$ are thus created in the at least one control unit 331, 332. The form of these step-up enabling/disabling signals $S_{step-up\_on/off}$ and bypass enabling/disabling signals $S_{bypass\_on/off}$ can be determined by the at least one control unit based on a number of different parameters, either based on single parameter values taken alone, or on two or more parameters in combination.

According to an embodiment of the invention, the at least one control unit is arranged to base the step-up $S_{step-up\_on/off}$ and/or bypass $S_{bypass\_on/off}$ enabling/disabling signals on a relation between the output voltage $U_{output}$ on the output DC bus 325 and a voltage threshold $U_{threshold}$. Here, a step-up enabling signal $S_{step-up\_on}$ and a bypass disabling signal $S_{bypass\_off}$ are generated by the at least one control unit 331, 332 when the output voltage $U_{output}$ is equal to or higher than the voltage threshold $U_{threshold}$; $U_{output} \geq U_{threshold}$. The embodiment is described more in detail below.

According to another embodiment of the invention, the at least one control unit 331, 332 is arranged to base the step-up $S_{step-up\_on/off}$ and/or $S_{bypass\_on/off}$ bypass enabling/disabling signals on a relation between an output current $I_{output}$ that is provided to the motor unit 303 on the output DC bus 325 and a current threshold $I_{threshold}$. Here, a step-up disabling signal $S_{step-up\_off}$ and a bypass enabling signal $S_{bypass\_on}$ are generated by the at least one control unit 331, 332 when the output current $I_{output}$ is equal to or higher than the current threshold $I_{threshold}$; $I_{output} \geq I_{threshold}$. The embodiment is described more in detail below.

According to an embodiment of the invention, the at least one control unit 331, 332 is arranged to base the step-up $S_{step-up\_on/off}$ and/or bypass $S_{bypass\_on/off}$ enabling/disabling signals on a relation between a rotational speed $\omega_{motor}$ of the motor unit 303 multiplied with a torque T that is provided by the tool 300; $\omega_{motor}*T$; and a speed and torque threshold $\omega T_{threshold}$. Thus, the rotational speed $\omega_{motor}$ and the torque T that is provided by the shaft/spindle 102 of the power tool is here compared with the speed and torque threshold $\omega T_{threshold}$. A step-up enabling signal $S_{step-up\_on}$ and a bypass disabling signal $S_{bypass\_off}$ is according to the embodiment generated by the at least one control unit 331, 332 when the rotational speed $\omega_{motor}$ multiplied with the torque T; $\omega_{motor}*T$; is lower than the speed and torque threshold $\omega T_{threshold}$; $\omega_{motor}*T < \omega T_{threshold}$. The embodiment is described more in detail below.

According to an embodiment of the invention, the at least one control unit 331, 332 is arranged to base the step-up $S_{step-up\_on/off}$ and/or bypass $S_{bypass\_on/off}$ enabling/disabling signals on a relation between an output power $P_{output}$ that is provided to the electrical motor unit 303 on the output DC bus 325 and a power threshold $P_{threshold}$. Here, a step-up enabling signal $S_{step-up\_on}$ and a bypass disabling signal $S_{bypass\_off}$ are generated by the at least one control unit 331, 332 when the output power $P_{output}$ on the output DC bus 325 is lower than the power threshold $P_{threshold}$; $P_{output} < P_{threshold}$. The embodiment is described more in detail below.

According to an aspect of the present invention, a method for providing an electrical motor unit 304 of a power tool 300 with an output voltage $U_{output}$ is presented. According to the method, at least one control unit 331, 332 is used for controlling the step-up converter 310 and the bypass circuit 320, as described above, such that the output voltage $U_{output}$ on the output DC bus 325 may be switched between the battery voltage $U_{battery}$ and the step-up voltage $U_{step-up}$; $U_{battery} \leq U_{output} \leq U_{step-up}$. This toggling output voltage is achieved by converting, when the step-up converter 310 is enabled, the battery voltage $U_{battery}$ that is provided to the step-up converter 310 by the battery unit 304 to the higher step-up voltage $U_{step-up}$; $U_{step-up} > U_{battery}$. This step-up voltage $U_{step-up}$ is then provided to the electrical motor unit 303 as an output voltage $U_{output}$; $U_{output} = U_{step-up}$. The toggling output voltage is also achieved by connecting, when the bypass circuit 320 is enabled, the battery unit 304 to the electrical motor unit 303, whereby the battery voltage $U_{battery}$ is provided to the electrical motor unit 303 as an output voltage $U_{output}$; $U_{output} = U_{battery}$.

By use of the method according to the present invention, the power tool 300 can be made compact in size and light in weight at the same time as it is possible to provide a high productivity when using the tool.

The at least one control unit 331, 332 thus controls the output voltage $U_{output}$ on the output DC bus 325 to switch between the battery voltage $U_{battery}$ and the step-up voltage $U_{step-up}$; $U_{battery} \leq U_{output} \leq U_{step-up}$. The at least one control unit can determine the suitable output voltage $U_{output}$ based on a number of parameters.

One such parameter is the level of the output voltage $U_{output}$ itself, whereby the at least one control unit 331, 332 disables the step-up converter 310 and enables the bypass circuit 320 when the output voltage $U_{output}$ is lower than a voltage threshold $U_{threshold}$; $U_{output} < U_{threshold}$. As described above, the PWM circuit 317 can include an overload limiting function, which reduces the step-up voltage $U_{step-up}$ if the step-up converter 310 is overloaded. Thus, also low output voltage values; $U_{output} < U_{threshold}$; resulting from such step-up converter overload and the following step-up voltage $U_{step-up}$ reduction, can be utilized as a parameter to base control of the step-up converter 310 and/or bypass circuit 320 on.

Another such parameter is the output current $I_{output}$, whereby the at least one control unit 331, 332 disables the step-up converter 310 and enables the bypass circuit 320 when the output current $I_{output}$ is higher than or equal to a current threshold $I_{threshold}$; $I_{output} \geq I_{threshold}$. The output current $I_{output}$ can here (and in table 1 below) either correspond to the current on the output DC bus 325, or to a motor current $I_{motor}$, that is provided to, and measured at, the motor, i.e. between the inverter 305 and the motor. The motor current $I_{motor}$ is normally already measured in power tools of today. Therefore, it adds very little complexity to use the motor current $I_{motor}$ as the output current $I_{output}$ parameter, since this parameter is output today already available in power tools.

The motor current $I_{motor}$ and the current on the output DC bus 325 can differ, since the motor current $I_{motor}$ is dependent on the torque T that is provided by the tool, whereas the current on the output DC bus 325 is dependent on the electrical power that is provided to the inverter 305.

Some examples of the parameters and the conditions for the enabling/disabling signals for the step-up converter $S_{step-up\_on/off}$ and/or for the bypass circuit $S_{bypass\_on/off}$ based on different values for these parameters are shown in table 1.

In tables 1, 2 and 3 below, and in this document, $S_{bypass\_on/off}=1$ means that the bypass circuit 320 is enabled ($S_{bypass\_on}$) and $S_{bypass\_on/off}=0$ means that the bypass circuit 320 is disabled ($S_{bypass\_off}$). Correspondingly, $S_{step-up\_on/off}=1$ means that the step-up converter 310 is enabled ($S_{step-up\_on}$) and $S_{step-up\_on/off}=0$ means that the step-up converter 310 is disabled ($S_{step-up\_off}$). Also, the tool trigger signal has the value 1 when the tool motor unit 303 is running and the value 0 when the motor unit 303 is not running. Thus, tool trigger=0 means that the motor unit is off and tool trigger=1 means that the motor unit is on/activated.

TABLE 1

| $S_{bypass\_on/off}$ | $S_{step-up\_on/off}$ | $U_{output}$ | $I_{output}$ | Tool trigger |
|---|---|---|---|---|
| 0 | 1 | $U_{output} \geq U_{threshold}$ | $I_{output} < I_{threshold}$ | 1 |
| 1 | 0 | $U_{output} < U_{threshold}$ | $I_{output} < I_{threshold}$ | 1 |
| 1 | 0 | $U_{output} > U_{threshold}$ | $I_{output} \geq I_{threshold}$ | 1 |
| 1 | 0 | $U_{output} < U_{threshold}$ | $I_{output} \geq I_{threshold}$ | 1 |
| 1 | 0 | Ignored | Ignored | 0 |

The $U_{output}$ and $I_{output}$ values in the tables correspond to the voltage and current values on the output DC bus 325. Alternatively, the $I_{output}$ values may correspond to the above mentioned motor current $I_{motor}$, as described above. As can be seen in table 1, one or more of these values $U_{output}$, $I_{output}$ can e.g. be used as conditions for triggering the one or more control units 331, 332 to enable the bypass circuit $S_{bypass\_on}$ and to disable the step-up converter $S_{step-up\_off}$ when the output voltage $U_{output}$ on the DC-bus 325 drops below a preset value $U_{threshold}$ while the tool trigger is in condition on, i.e. when the tool 300 is activated. Also, the one or more control units 331, 332 can be triggered to enable the bypass circuit $S_{bypass\_on}$ and disable the step-up converter $S_{step-up\_off}$ when the output current $I_{output}$ on the DC-bus 325 is higher than or equal to a preset value $I_{threshold}$ while the tool trigger is in condition on.

Another such parameter is the rotational speed $\omega_{motor}$ and torque T that is provided by the power tool 300, whereby the at least one control unit 331, 332 enables the step-up converter 310 and disables the bypass circuit 320 when the rotational speed $\omega_{motor}$ of the motor unit 303 multiplied with a torque T that is provided by the power tool 300; $\omega_{motor}*T$; is lower than the speed and torque threshold $\omega T_{threshold}$; $\omega_{motor}*T < \omega T_{threshold}$.

Examples of the parameters and the conditions for the enabling/disabling signals for the step-up converter $S_{step-up\_off}$ and/or for the bypass circuit $S_{bypass\_off}$ on/off based on different values for this parameter are shown in table 2.

TABLE 2

| $S_{bypass\_on/off}$ | $S_{step-up\_on/off}$ | $\omega_{motor}*T$ | Tool trigger |
|---|---|---|---|
| 0 | 1 | $\omega*T < \omega T_{threshold}$ | 1 |
| 1 | 0 | $\omega*T \geq \omega T_{threshold}$ | 1 |
| 1 | 0 | Ignored | 0 |

In table 2, $\omega$ is the rotational speed of the tool in rad/s and T is the torque in Nm that is provided by the tool.

As can be seen in table 2, the parameter values for $\omega_{motor}*T$ can be used as conditions for triggering the one or more control units 331, 332 to enable the bypass circuit $S_{bypass\_on}$ and to disable the step-up converter $S_{step-up\_off}$ when $\omega*T \geq \omega T_{threshold}$ while the tool trigger is in condition on, i.e. when the tool 300 is activated. Also, the one or more control units 331, 332 can be triggered to disable the bypass circuit $S_{bypass\_off}$ and enable the step-up converter $S_{step-up\_on}$ when $\omega*T < \omega T_{threshold}$ while the tool trigger is in condition on.

Another such parameter is the output power $P_{output}$ on the output DC bus 325, whereby the at least one control unit 331, 332 enables the step-up converter 310 and disables the bypass circuit 320 when the output power $P_{output}$ that is provided to said electrical motor unit 303 is lower than a power threshold $P_{threshold}$; $P_{output} < P_{threshold}$.

Examples of the parameters and the conditions for the enabling/disabling signals for the step-up converter $S_{step-up\_on/off}$ and/or for the bypass circuit $S_{bypass\_on/off}$ based on different values for this parameter are shown in table 3.

TABLE 3

| $S_{bypass\_on/off}$ | $S_{step-up\_on/off}$ | $P_{output}$ | Tool trigger |
|---|---|---|---|
| 0 | 1 | $P_{output} < P_{threshold}$ | 1 |
| 1 | 0 | $P_{output} \geq P_{threshold}$ | 1 |
| 1 | 0 | Ignored | 0 |

Here, the output power $P_{output}$ on the output DC bus 325 can be calculated as $P_{output} = I_{output}*U_{output}$ on the output DC bus 325.

As can be seen in table 3, the parameter values for the output power $P_{output}$ can be used as conditions for triggering the one or more control units 331, 332 to enable the bypass circuit $S_{bypass\_on}$ and to disable the step-up converter $S_{step-up\_off}$ when $P_{output} \geq P_{threshold}$ while the tool trigger is in condition on. Also, the one or more control units 331, 332 can be triggered to disable the bypass circuit $S_{bypass\_off}$ and enable the step-up converter $S_{step-up\_on}$ when $P_{output} < P_{threshold}$ while the tool trigger is in condition on.

According to an embodiment, the at least one control unit 331, 332 can base the enabling/disabling signals for the step-up converter $S_{step-up\_on/off}$ and/or for the bypass circuit $S_{bypass\_on/off}$ on a combination of two or more of these parameters, i.e. on two or more of the output voltage $U_{output}$, the output current $I_{output}$, the rotational speed $\omega_{motor}$ and torque T, and the output power $P_{output}$.

Figure 4:
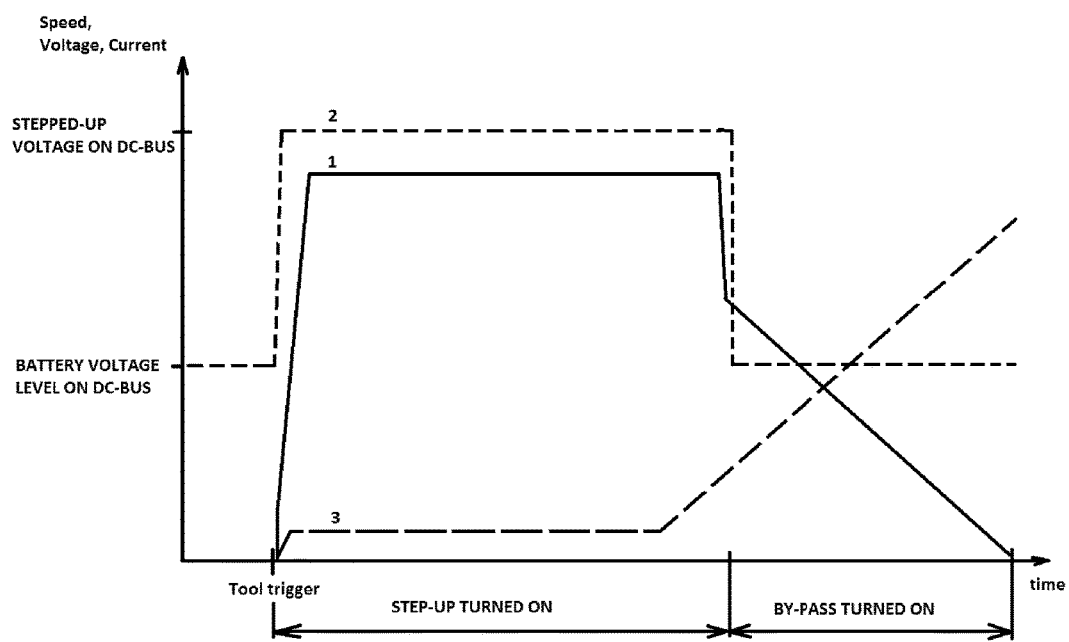
FIG. 4 shows a tool activation diagram for a tool according to an embodiment of the invention.
Figure 5:
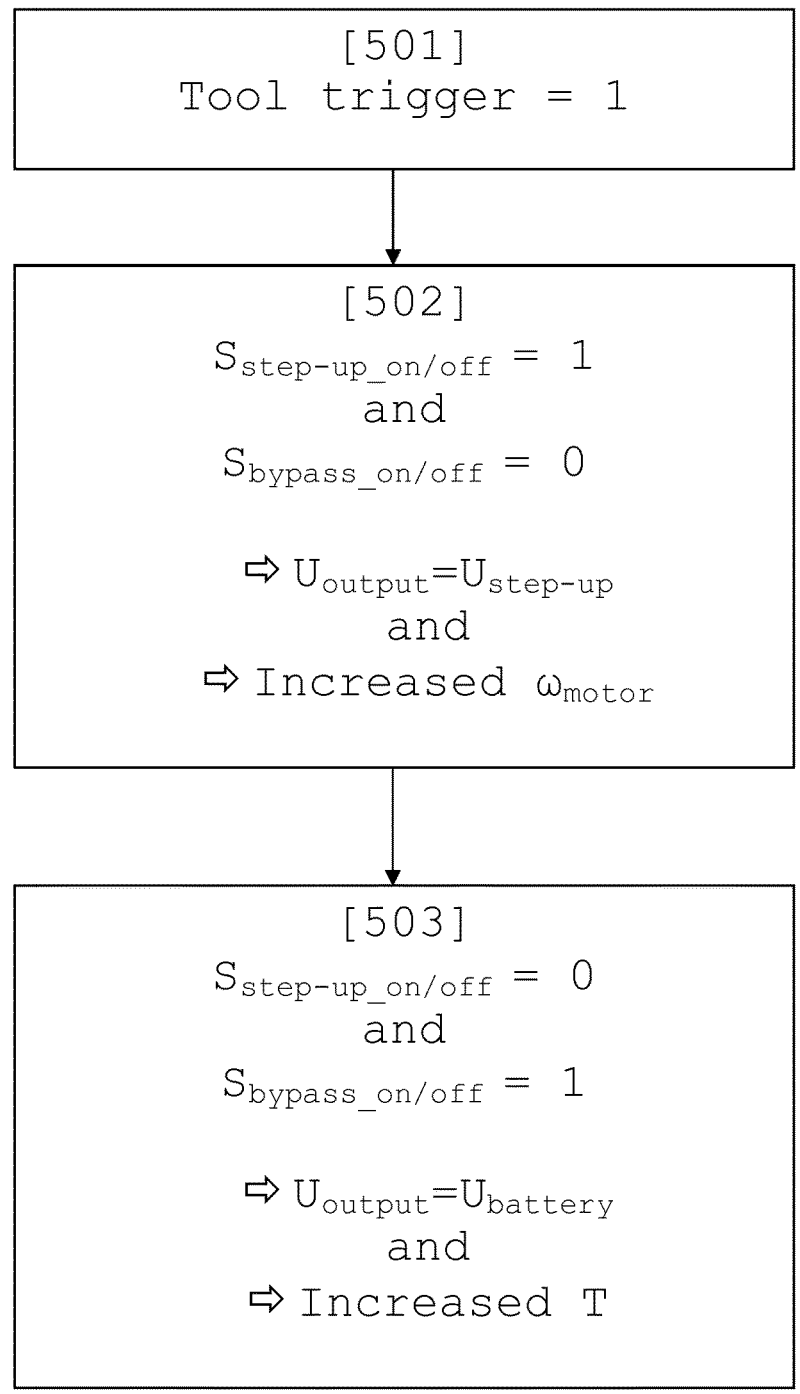
FIG. 5 shows a flowchart of an activation method for a tool according to an embodiment of the invention.

FIG. 4 schematically illustrates a non-limiting example describing a possible use of the present invention, which could correspond e.g. to a tool use including tightening of a nut. FIG. 5 shows a flow sheet diagram for the corresponding method according to an embodiment of the invention.

In a first step 501 of the method, the power tool 300 is activated, i.e. the tool trigger has the value 1. In FIG. 4, this happens at the position "Tool trigger" along the time axis.

In a second step 502, the step-up converter 310 is enabled $S_{step-up\_on/off}=1$ and the bypass circuit 320 is disabled $S_{bypass\_on/off}=0$. The first phase of the tool activation is thereby started, wherein the higher step-up voltage $U_{step-up}$ is provided to the electrical motor unit 303 as an output voltage $U_{output}$ on the output DC bus 325 (curve 2 in FIG. 4); $U_{output}=U_{step-up}$. Hereby, the rotational speed $\omega_{motor}$ of the motor unit 303 is increased (curve 1 in FIG. 4) as a result of the higher step-up voltage $U_{step-up}$ that is input to the motor unit 303. Also, the output current $I_{output}$ and/or the torque T (curve 3 in FIG. 4) is slightly increased. Thus, during the first phase, where the step-up converter is enabled/turned on, an increased rotational speed $\omega_{motor}$ can be achieved by the present invention, which means that the nut can be quickly tightened during a phase where not too much torque is needed for the tightening.

In a third step 503, the bypass circuit 320 is enabled $S_{bypass\_on/off}=1$ and the step-up converter 310 is disabled $S_{step-up\_on/off}=0$ during the second phase of the activation. The battery voltage $U_{battery}$ is thereby provided to the electrical motor unit 303 as an output voltage $U_{output}$ (curve 2 in FIG. 4); $U_{output}=U_{battery}$. Hereby, the rotational speed $\omega_{motor}$ of the motor unit 303 is decreased (curve 1 in FIG. 4) as a result of the lower battery voltage $U_{battery}$ that is input to the motor unit 303, and also due to the increased resistance of the nut because of the higher torque needed. Also, the output current $I_{output}$ and/or the torque T (curve 3 in FIG. 4) is increased. Thus, during the second phase, where the bypass circuit is enabled, an increased torque can be achieved by the present invention during the second phase where a high torque T is needed for the tightening.

According to another embodiment of the present invention, the power tool 300 is arranged for providing a high torque T during a first activation phase, and a high rotational speed $\omega_{motor}$ during a second activation phase. This embodiment can be particularly useful e.g. for loosening of nuts, where a high torque T is needed for the first actual loosening phase and a high speed $\omega_{motor}$ and low torque T is needed for the second phase, when the nut is already loosened. This embodiment is achieved by enabling the bypass circuit 320 $S_{bypass\_on/off}=1$ and disabling the step-up converter 310 $S_{step-up\_on/off}=0$ during the first phase of the activation. The battery voltage $U_{battery}$ is thereby provided to the electrical motor unit 303 as an output voltage $U_{output}$, whereby high torque T and low speed $\omega_{motor}$ is provided.

Thereafter, the step-up converter 310 is enabled $S_{step-up\_on/off}=1$ and the bypass circuit 320 is disabled $S_{bypass\_on/off}=0$ during the second phase, whereby the higher step-up voltage $U_{step-up}$ is provided to the electrical motor unit 303 as an output voltage $U_{output}$ on the output DC bus 325. Thus, a low torque T and high speed $\omega_{motor}$ is provided during the second phase.

According to another embodiment of the present invention, the bypass circuit 320 is enabled and the step-up converter 310 is disabled during retardation, i.e. deceleration, of the rotational speed of the power tool. Thus, when the rotational speed of the electrical motor unit 303 is quickly slowing down, the electrical motor unit 303 is coupled directly to the battery unit 304 and not to the step-up converter 310. Hereby, the rotational energy of the electrical motor unit 303 and of the spindle/shaft 102, that is set free during the retardation, can be converted to electrical energy and can be utilized for charging the battery unit 304. For example, when the battery unit 304 includes one or more super capacitors, the electrical energy that is extracted from the rotational energy made free during the retardation can be used for charging the super capacitors.

The power tool of the invention can be adapted to perform any of the steps of the method of the invention. The different steps of the method of the invention described above can be combined or performed in any suitable order.

The method of the invention can implemented by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The power tool and the methods according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A power tool, comprising an electrical motor unit that is connectable to a battery unit, wherein:
   a step-up converter is connectable between said battery unit and said electrical motor unit, which is arranged for converting, when enabled, a battery voltage $U_{battery}$ that is provided to said step-up converter by said battery unit to a higher step-up voltage $U_{step-up}$, $U_{step-up} > U_{battery}$, said step-up voltage $U_{step-up}$ being provided to said electrical motor unit as an output voltage $U_{output}$, $U_{output}=U_{step-up}$;
   a bypass circuit is arranged in parallel with said step-up converter and connects, when enabled, said battery unit to said electrical motor unit and provides said battery voltage $U_{battery}$ to said electrical motor unit as said output voltage $U_{output}$, $U_{output}=U_{battery}$;
   at least one control unit is provided for controlling said step-up converter and said bypass circuit such that said output voltage $U_{output}$ is switchable between said battery voltage $U_{battery}$ and said step-up voltage $U_{step-up}$;
   said control unit is configured to control said step-up converter and said bypass circuit to alter said output voltage $U_{output}$ that is provided to said electrical motor unit to achieve a higher rotational speed of said electrical motor unit and a lower torque provided by said power tool during a first phase of a screw tightening process, followed by a lower rotational speed of said electrical motor unit and a higher torque provided by said power tool during a second phase of the screw tightening process; and said control by the control unit is performed based on at least one of a plurality of different tool related parameters, said parameters comprising (i) said output voltage $U_{output}$, (ii) an output current $I_{output}$ being provided to said electrical motor unit, (iii) said rotational speed $\omega_{motor}$ of said electrical motor unit multiplied with said torque T being provided by said tool, $\omega_{motor}*T$, and (iv) an output power $P_{output}$ being provided to said electrical motor unit.

2. The power tool according to claim 1, wherein said step-up converter is a synchronous step-up converter including at least one step-up transistor, at least one inductor, and at least one step-up switch.

3. The power tool according to claim 2, wherein said step-up converter includes a step-up control circuitry configured to control said at least one step-up transistor and said at least one step-up switch connecting said step-up converter to said electrical motor unit when enabled.

4. The power tool according to claim 3, wherein said step-up control circuitry includes a voltage regulation circuitry configured to control said higher voltage $U_{step-up}$ towards a target voltage $U_{target}$ and having an output of said step-up converter as an input.

5. The power tool according to claim 1, wherein said bypass circuit includes a bypass switch controlled by said at least one control unit.

6. The power tool according to claim 3, wherein said bypass circuit includes a bypass switch controlled by said at least one control unit; and
wherein one or more of said at least one step-up switch, said step-up transistor, and said bypass switch are implemented as any one in the group of:
an N-channel MOSFET (Metal Oxide Semiconductor Field Effect Transistor); and
an P-channel MOSFET (Metal Oxide Semiconductor Field Effect Transistor).

7. The power tool according to claim 1, wherein said at least one control unit is configured to provide said bypass circuit with a bypass enabling/disabling signal $S_{bypass\_on/off}$, said bypass circuit being configured to enable or disable the connection of said battery unit to said electrical motor unit based on said bypass enabling/disabling signal $S_{bypass\_on/off}$.

8. The power tool according to claim 1, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$.

9. The power tool according to claim 7, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$; and
wherein said at least one control unit is configured to base said step-up enabling/disabling signal $S_{step-up\_on/off}$ and/or said bypass enabling/disabling signal $S_{bypass\_on/off}$ on a relation between the at least one of said parameters ($U_{output}$, $I_{output}$, $\omega_{motor}*T$, $P_{output}$) and at least one threshold value ($U_{threshold}$, $I_{threshold}$, $\omega T_{threshold}$, $P_{threshold}$) relating to the at least one of said parameters.

10. The power tool according to claim 7, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$; and
wherein said at least one control unit is configured to base said step-up enabling/disabling signal $S_{step-up\_on/off}$ and/or said bypass enabling/disabling signal $S_{bypass\_on/off}$ on a relation between said output voltage $U_{output}$ and a voltage threshold $U_{threshold}$.

11. The power tool according to claim 10, wherein said at least one control unit is configured to generate a step-up enabling signal $S_{step-up\_on}$ and a bypass disabling signal $S_{bypass\_off}$ when said output voltage $U_{output}$ is equal to or higher than said voltage threshold $U_{threshold}$ ($U_{output} \geq U_{threshold}$).

12. The power tool according to claim 7, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$; and
wherein said at least one control unit is configured to base said step-up enabling/disabling signal $S_{step-up\_on/off}$ and/or said bypass enabling/disabling signal $S_{bypass\_on/off}$ on a relation between said output current $I_{output}$ being provided to said electrical motor unit and a current threshold $I_{threshold}$.

13. The power tool according to claim 12, wherein said at least one control unit is configured to generate a step-up disabling signal $S_{step-up\_off}$ and a bypass enabling signal $S_{bypass\_on}$ when said output current $I_{output}$ is equal to or higher than said current threshold $I_{threshold}$ ($I_{output} \geq I_{threshold}$).

14. The power tool according to claim 7, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$; and
wherein said at least one control unit is configured to base said step-up enabling/disabling signal $S_{step-up\_on/off}$ and/or said bypass enabling/disabling signal $S_{bypass\_on/off}$ on a relation between said rotational speed $\omega_{motor}$ of said electrical motor unit multiplied with said torque T being provided by said tool, $\omega_{motor}*T$, and a speed and torque threshold $\omega T_{threshold}$.

15. The power tool according to claim 14, wherein said at least one control unit is configured to generate a step-up enabling signal $S_{step-up\_on}$ and a bypass disabling signal $S_{bypass\_off}$ when said rotational speed $\omega_{motor}$ multiplied with said torque T, $\omega_{motor}*T$, is lower than said speed and torque threshold $\omega T_{threshold}$ ($\omega_{motor}*T < \omega T_{threshold}$).

16. The power tool according to claim 7, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$; and wherein said at least one control unit is configured to base said step-up enabling/disabling signal $S_{step-up\_on/off}$ and/or said bypass enabling/disabling signal $S_{bypass\_on/off}$ on a relation between said output power $P_{output}$ being provided to said electrical motor unit and a power threshold $P_{threshold}$.

17. The power tool according to claim 16, wherein said at least one control unit is configured to generate a step-up enabling signal $S_{step-up\_on}$ and a bypass disabling signal $S_{bypass\_off}$ when said output power $P_{output}$ is lower than said power threshold $P_{threshold}$ ($P_{output}<P_{threshold}$).

18. The power tool according to claim 7, wherein said at least one control unit is configured to provide said step-up converter with a step-up enabling/disabling signal $S_{step-up\_on/off}$, said step-up converter being configured to enable or disable the voltage conversion of said step-up converter based on said step-up enabling/disabling signal $S_{step-up\_on/off}$; and wherein said bypass enabling/disabling signal $S_{bypass\_on/off}$ and said step-up enabling/disabling signal $S_{step-up\_on/off}$ are complementary signals.

19. The power tool according to claim 1, wherein said step-up converter includes two step-up transistor circuits being operated in mutually opposite phases.

20. The power tool according to claim 1, wherein said step-up converter and said bypass circuit are arranged integrated within a body of said power tool, said step-up converter and said bypass circuit being connected to said electrical motor unit and being connectable to said battery unit.

21. The power tool according to claim 1, wherein said step-up converter and said bypass circuit are arranged integrated with and connected to said battery unit, and are connectable to said electrical motor unit.

22. The power tool according to claim 1, wherein said step-up converter and said bypass circuit are arranged separately between said battery unit and said electrical motor unit, said step-up converter and said bypass circuit being connectable to said battery unit and to said electrical motor unit.

23. The power tool according to claim 1, wherein said battery unit includes at least one super capacitor.

24. The power tool according to claim 1, wherein said power tool includes a brake chopper arranged for consuming energy provided by said electrical motor unit when said rotational speed of said electrical motor unit is reduced.

25. A method for providing an electrical motor unit of a power tool with an output voltage $U_{output}$, the method comprising:

converting, when a step-up converter that is connectable between a battery unit and said electrical motor unit is enabled, a battery voltage $U_{battery}$ that is provided to said step-up converter by said battery unit to a higher step-up voltage $U_{step-up}$, $U_{step-up}>U_{battery}$, and providing said step-up voltage $U_{step-up}$ to said electrical motor unit as said output voltage $U_{output}$, $U_{output}=U_{step-up}$;

connecting, when a bypass circuit that is arranged in parallel with said step-up converter is enabled, said battery unit to said electrical motor unit, and providing said battery voltage $U_{battery}$ to said electrical motor unit as said output voltage $U_{output}$, $U_{output}=U_{battery}$; and controlling, by use of at least one control unit, said step-up converter and said bypass circuit such that said output voltage $U_{output}$ is switchable between said battery voltage $U_{battery}$ and said step-up voltage $U_{step-up}$, to alter said output voltage $U_{output}$ that is provided to said electrical motor unit to achieve a higher rotational speed of said electrical motor unit and a lower torque provided by said power tool during a first phase of a screw tightening process, followed by a lower rotational speed of said electrical motor unit and a higher torque provided by said power tool during a second phase of the screw tightening process;

wherein the controlling of said step-up converter and said bypass circuit is performed based on at least one of a plurality of different tool related parameters, said parameters comprising (i) said output voltage $U_{output}$, (ii) an output current $I_{output}$ being provided to said electrical motor unit, (iii) said rotational speed $\omega_{motor}$ of said electrical motor unit multiplied with said torque T being provided by said tool, $\omega_{motor}*T$, and (iv) an output power $P_{output}$ being provided to said electrical motor unit.

26. The method according to claim 25, wherein said at least one control unit disables said step-up converter and enables said bypass circuit when the at least one of said parameters ($U_{output}$, $I_{output}$, $\omega_{motor}*T$, $P_{output}$) reaches above or below a certain threshold ($U_{threshold}$, $I_{threshold}$, $\omega T_{threshold}$, $P_{threshold}$) relating to the at least one of said parameters.

27. The method according to claim 25, wherein said at least one control unit disables said step-up converter and enables said bypass circuit when said output voltage $U_{output}$ is lower than a voltage threshold $U_{threshold}$ ($U_{output}<U_{threshold}$).

28. The method according to claim 25, wherein said at least one control unit disables said step-up converter and enables said bypass circuit when said output current $I_{output}$ is higher than or equal to a current threshold $I_{threshold}$ ($I_{output} \geq I_{threshold}$).

29. The method according to claim 25, wherein said at least one control unit enables said step-up converter and disables said bypass circuit when said rotational speed $\omega_{motor}$ of said electrical motor unit multiplied with said torque T that is provided by said power tool, $\omega_{motor}*T$, is lower than a speed and torque threshold $\omega T_{threshold}$ ($\omega_{motor}*T<\omega T_{threshold}$).

30. The method according to claim 25, wherein said at least one control unit enables said step-up converter and disables said bypass circuit when said output power $P_{output}$ that is provided to said electrical motor unit is lower than a power threshold $P_{threshold}$ ($P_{output}<P_{threshold}$).

31. The method according to claim 25, wherein said screw tightening process includes:

enabling said step-up converter and disabling said bypass circuit during said first phase of said screw tightening process, thereby providing said step-up voltage $U_{step-up}$ to said electrical motor unit as said output voltage $U_{output}$, $U_{output}=U_{step-up}$, whereby said rotational speed $\omega_{motor}$ of said electrical motor unit is increased as a result of the higher step-up voltage $U_{step-up}$; and enabling said bypass circuit and disabling said step-up converter during said second phase of said screw tightening process, thereby providing said battery voltage $U_{battery}$ to said electrical motor unit as said output voltage $U_{output}$, $U_{output}=U_{battery}$, whereby said rotational speed $\omega_{motor}$ of said electrical motor unit is decreased as a result of the lower battery voltage $U_{battery}$.

32. A non-transitory computer readable medium storing a computer program that is executable by a computer of a power tool to perform the method according to claim 25.

\* \* \* \* \*